United States Patent [19]
Chang

[11] Patent Number: 5,931,209
[45] Date of Patent: Aug. 3, 1999

[54] SLIDABLE TOOL TABLE EXTENSION AND LOCKING ARRANGEMENT

[75] Inventor: Paul C. T. Chang, Taichung, Taiwan

[73] Assignee: P & F Brother Industrial Corp., Taiwan

[21] Appl. No.: 09/138,704

[22] Filed: Aug. 24, 1998

[51] Int. Cl.⁶ .................................................. B25H 1/00
[52] U.S. Cl. ...................... 144/287; 83/438; 83/468.7; 83/477.2; 108/65; 144/286.1; 269/229; 269/236; 269/289 R; 269/318
[58] Field of Search .................................. 83/438, 468.7, 83/477.2; 108/63, 65, 102; 144/286.1, 286.5, 287; 269/229, 231, 236, 289, 309, 318

[56] References Cited

U.S. PATENT DOCUMENTS

| | | | |
|---|---|---|---|
| 4,546,804 | 10/1985 | Haeger | 144/287 |
| 4,658,687 | 4/1987 | Haas et al. | 83/438 |
| 4,677,920 | 7/1987 | Eccardt | 108/65 |
| 4,955,941 | 9/1990 | Rousseau | 108/65 |
| 5,460,070 | 10/1995 | Buskness | 83/438 |
| 5,722,308 | 3/1998 | Ceroll | 144/287 |

*Primary Examiner*—W. Donald Bray
*Attorney, Agent, or Firm*—Welsh & Katz, Ltd.

[57] ABSTRACT

A locking extension for a tool table includes first and second rails slidingly mounted to opposing sides of the tool table and an extension having a support surface fixedly mounted to and spanning the first and second rails. A locking assembly for locking both of the rails to the tool table at a desired position includes a first linkage member having an axis and being longitudinally movable relative to the axis by a pair of cooperating cam blocks. A second linkage member is biased and is operably connected to the first linkage member by a pivot member. The linkage members each have a rail engaging element mounted to an end thereof that is engagable with its respective rail to lock the rails into the desired position and disenageable with its respective rail to unlock the rails from the desired position. The locking assembly includes an actuator operably connected to one of the cam blocks for moving the locking assembly between the locked and unlocked states.

21 Claims, 2 Drawing Sheets

SLIDABLE TOOL TABLE EXTENSION AND LOCKING ARRANGEMENT

FIELD OF THE INVENTION

This invention pertains to a slidable extension for a tool table and a locking arrangement therefor. More particularly, the invention pertains to a slidable extension for a tool table and a single-motion locking arrangement for locking the extension in a desired position.

BACKGROUND OF THE INVENTION

Table mounted tools, such as table saws, are often used for cutting large material items, such as large sheets of plywood and the like. It is imperative when using such power tools, that the material be properly supported in order to maintain the material in contact with, for example, the saw blade. As such, various arrangements are used to support the material as it is progressively moved in toward the saw blade, i.e., as the material is fed into the cutting region.

One often used method for supporting such materials is to erect one or more saw-horses at the "feed" end of the saw table. Those that have used such an arrangement realize that the saw-horses may not remain in place as the material is progressively fed into the cutting area. That is, the saw-horses may not remain stable during the cutting operation.

A variety of table extensions have been used that essentially clamp to the top of the saw table. While these extensions provide sufficient support for the material, they can be cumbersome, time consuming or difficult to use. The above-noted arrangements are, of course, preferable to merely allowing the material to cantilever or hang over the edge of the saw table and preferable to having an assistant support the material as it is feed into the cutting region.

One known table extension includes a pair of side rails that are slidingly received along the edges of the table top. An extension portion is positioned between the sliding rails and slides forward and rearward relative to the saw blade. The position of the extension is maintained fixed relative to the table top by a plurality of screw-like clamping arrangements positioned on the rails and/or table top. Although this arrangement works quite well to secure the extension portion of the top in position relative to the saw table top, the plurality of screw-like clamps requires movement around the table to secure the extension in a desired position. This can become particularly time consuming when it is necessary to frequently adjust the position of the extension.

Accordingly, there exists the need for a table top extension locking arrangement that securely fixes the extension in a desired position and is readily easy to use. Preferably, such a locking arrangement requires a single actuation to lock the extension at any of a variety of locations relative to the table saw top.

SUMMARY OF THE INVENTION

A locking extension for a tool table having a planar surface and defining a pair of opposing sides includes first and second rails slidingly mounted to the opposing sides of the tool table. The extension includes an extension support surface that is fixedly mounted to and spans the first and second rails.

A locking assembly for locking both of the rails to the tool table at a desired position includes a first linkage member pivotably and longitudinally movable along an axis. The first linkage member is longitudinally movable along the axis by a pair of cooperating cam blocks. The first linkage member includes a first rail engaging element mounted to an end of the member that is engagable with the first rail, preferably at an inner surface thereof, to lock the first rail into the desired position and disenageable with the first rail to unlock the first rail from the desired position.

The locking assembly includes a pivot member having first and second pivot arms. The first pivot arm is operably connected to the first linkage member. A second linkage member is operably connected to the second pivot arm and is thus operably connected to, and moveable with, the first linkage member by the pivot member.

The second linkage member has a second rail engaging element mounted to an end that is engagable with the second rail to lock the second rail into the desired position and disenageable with the second rail to unlock the second rail from the desired position. Preferably, the second rail engaging element engages its rail at an inner surface thereof.

The assembly further includes an actuator operably connected to one of the cam blocks for moving the assembly between the locked and unlocked states. The actuator can be formed as a handle.

In a preferred embodiment, the locking assembly includes a biasing element at about one of the first and second linkage members. Most preferably, the biasing member is positioned about the second linkage member and biases the locking assembly into the unlocked state.

Preferably, one of the cam blocks is fixed relative to the locking assembly and the actuator is fixedly connected to the other cam block. In a current embodiment, the actuator and the cam block fixedly connected thereto are fixedly mounted to the first linkage member.

In a most preferred arrangement, the cam blocks each include a camming surface defining a lobe portion and a well portion, and each cam block includes a base portion in opposing relation to the camming surface. The blocks cooperate with one another by engagement of the camming surfaces to define an extended state wherein the camming surfaces are engaged with one another in a lobe-to-lobe arrangement to lock the extension in the desired position, and a retracted position wherein the camming surfaces are engaged with one another in a lobe-to-well arrangement to unlock the extension from its previously locked position.

Other features and advantages of the present invention will be apparent from the following detailed description, the accompanying drawings, and the appended claims.

DETAILED DESCRIPTION OF THE PREFERRED EMBODIMENT

Figure 1:
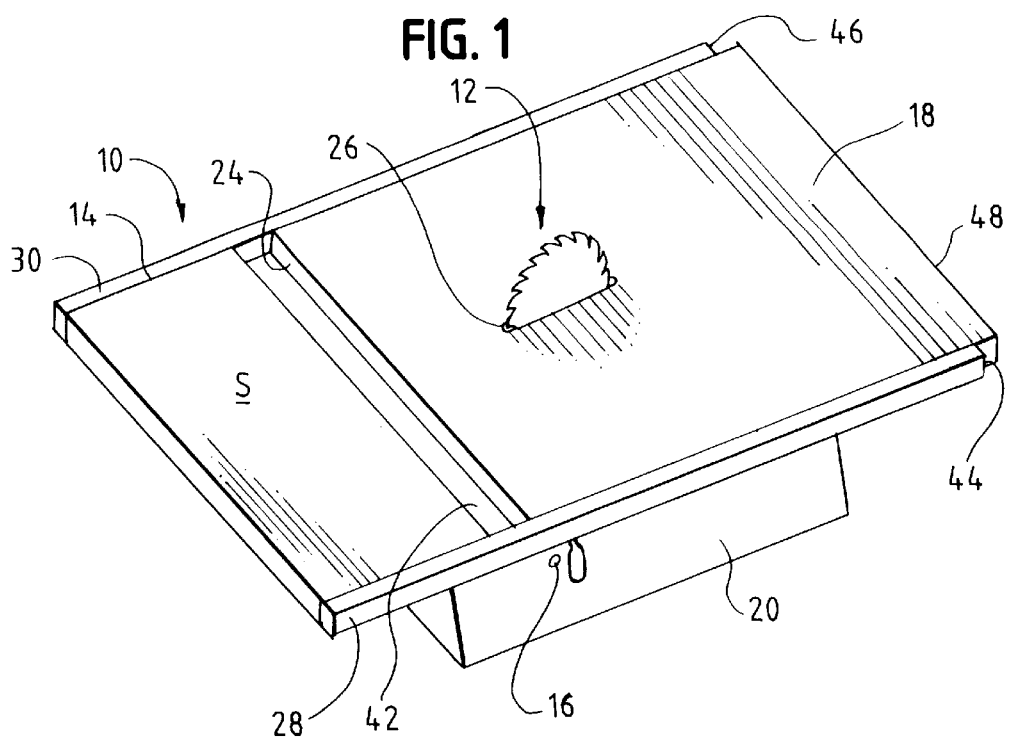
FIG. 1 is a perspective view of an exemplary tool table having a slidable table extension and locking arrangement in accordance with the principles of the present invention, the extension being illustrated with an exemplary table saw.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

Referring now to the figures and in particular to FIG. 1, there is illustrated a tool table 10 having an exemplary saw blade assembly 12. The table 10 includes an extension 14 and locking arrangement 16 embodying the principles of the present invention. The table 10 includes, generally, a table top portion 18, a base 20, and the extension portion 14. In one embodiment for use with the illustrated saw blade assembly 12, the assembly 12 includes a moveable blade and drive, indicated generally at 22, positioned below the table top 18, within the base 20, so that a portion of the saw blade 22 extends above the top of the table top 18. In a typical arrangement, the saw blade assembly 22 is vertically adjustable to adjust the height of the saw blade (i.e., cut depth) and can be angularly adjustable to perform bevel cuts.

The extension 14 is positioned at an end 24 of the table top 18, generally forward of the saw blade 22 and cutting region, indicated generally at 26. The extension 14 is mounted to the table top 18 by a pair of rails 28, 30. Preferably, the rails 28, 30 are fixedly mounted to the extension 14 and slidingly mounted to the table top 18.

Figure 5:
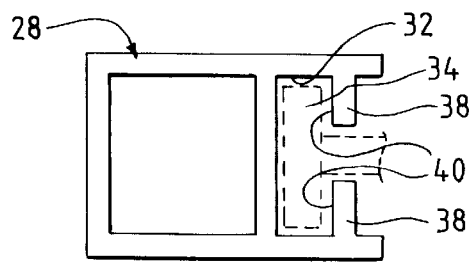
FIG. 5 is a cross-sectional view of the rail of the table taken along line 5—5 of FIG. 2.

A cross-section of an exemplary rail 28 is illustrated in FIG. 5. The rail 28 includes a lipped channel 32 that is configured to receive rail engaging elements 34, 36 (one shown) of the locking assembly 16, as is discussed in detail herein. The lips 38 of the channel 32 include an inner surface 40 that is configured to engage the engaging elements 34, 36 to clamp or lock the rails 28, 30, and thus the extension 14 in a desired position, relative to the table top 18. As will be apparent from the drawings, a variety of cross-sectional arrangements can be used for the rails 28, 30 of the present invention. The illustrated cross-section is only one embodiment and is not intended to limit the invention to the illustrated embodiment.

The surface S of the table extension 14, which is flush, i.e., coplanar, with the top of the table top 18, spans the rails 28, 30. The extension 14 essentially permits elongation of the table top 18 in the direction of progressive feed of the material to the cutting region 26. As can be seen from FIG. 1, as the extension 14 is moved to an extended position, away from the cutting region 26, a gap 42 is created between the extension 14 and the table top 18. Nevertheless, the extension 14 provides support for the material to be worked as the material extends from the cutting region 26, over the gap 42, and onto the extension 14. As is also seen from FIG. 1, as the extension 14 is moved away from the cutting region 26, the rail ends 44, 46, which are fixed to the extension 14, slide accordingly, away from the rear-most edge 48 of the table top 18.

Figure 2:
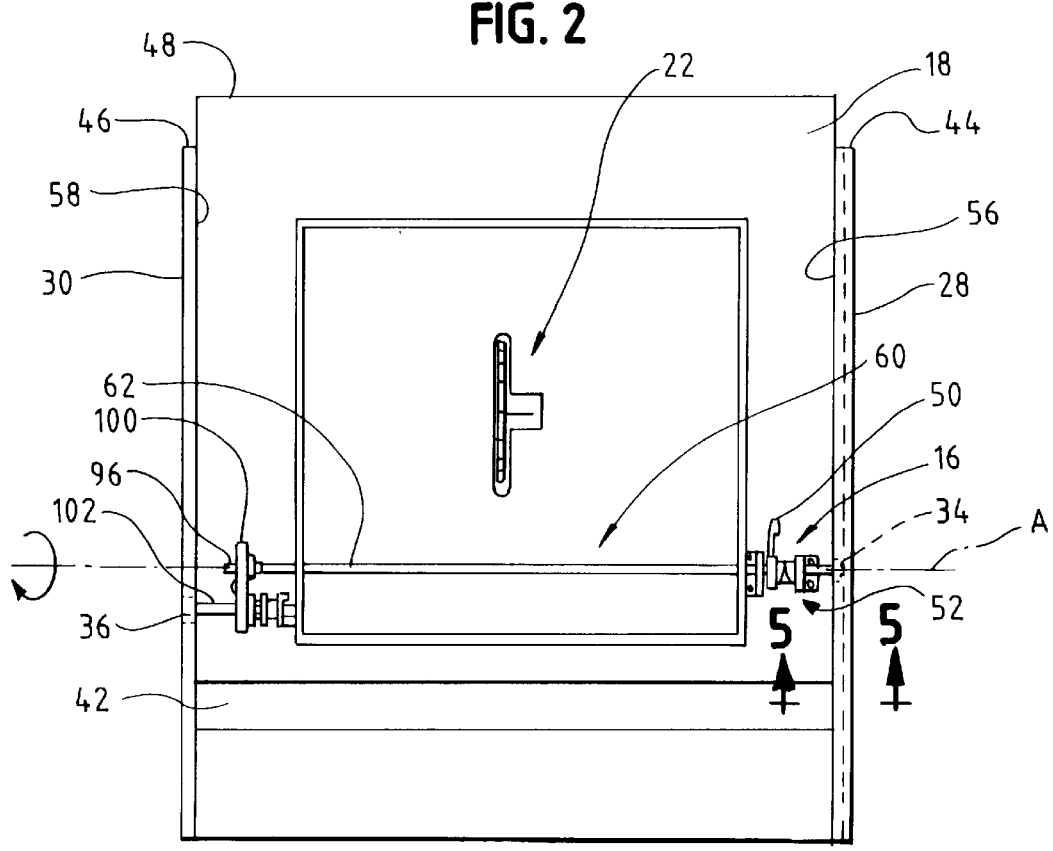
FIG. 2 is a bottom view of the table saw of FIG. 1, illustrating the extension and locking arrangement of the present invention.

It will be recognized by those familiar with such table mounted tools, that it is often desirable to set the extension portion 14 at a selected position and lock the extension portion 14 in that position to support the material or work piece. The present invention includes a locking arrangement or assembly 16 that permits selectively positioning the extension portion 14 at any of a continuously variable, selected, desired positions. To this end, as illustrated in FIG. 2, the locking arrangement 16 includes a single actuator, such as the illustrated handle 50, to actuate a plurality of clamping devices, illustrated generally at 52 and 54 to so lock the extension 14. In a current embodiment, two clamps 52, 54 are located in generally opposing relation to one another, and slightly offset from one another, at opposite sides 56, 58 of the table top 18 so as to clamp or engage both of the rails 28, 30. It will be recognized by those skilled in the art, that the present arrangement can incorporate more than the two illustrated clamps 52, 54 through the use of linkages, such as mechanical linkages and the like.

The locking arrangement 16 uses a mechanical linkage illustrated generally at 60, to permit actuation of the clamps 52, 54 from the single actuator, e.g., handle 50. The linkage 60 includes a first linkage member 62 such as the elongated rod, that is pivotable about its axis A, and which moves or reciprocates longitudinally along the axis A. Pivotal motion of the rod 62 is effectuated by rotating the handle 50 from a first, e.g., locked position, as illustrated in FIG. 3A to a second, e.g., unlocked position, as illustrated in FIG. 3B.

Longitudinal movement of the rod 62 is provided by the engagement of a pair of cooperating cam blocks 64, 66. The cam blocks 64, 66 each have a camming surface 68, 70 that cooperates with and engages the camming surface of the opposing block to move the rod 62 back and forth in a reciprocating manner as indicated by the double-headed arrow at 72. The camming surfaces 68, 70 each include a lobe portion 74, 76 and a well portion 78, 80. The lobe portion 74, 76 is that portion of the camming surface 68, 70 that is at about a greatest distance from that block's respective base surface 82, 84. Conversely, the well portion 78, 80 is that portion of the camming surface 68, 70 that is at about a least distance from that block's base surface 82, 84. As shown in FIGS. 3A and 3B, movement of the blocks 64, 66 relative to one another results in an overall movement of the block base surfaces 82, 84 toward and away from one another by a distance of travel about equal to the distance as indicated at D in FIG. 3A.

The first cam block 64 is fixed or stationary relative to the table top 18, and is fixed on a block mount 86, which also serves to support and center the first linkage member, e.g., rod 62. The mount 86 includes a mounting leg 88 that is fastened to a bottom surface of the table top 18 and a transverse free leg 90 having an opening 92 therethrough for receiving the rod 62. It will be apparent from the drawings that both the first and second cam blocks 62, 64 have openings therethrough to permit the rod 62 to traverse through the blocks 64, 66. The second cam block 66 is fixedly mounted to the rod 62 and is pivotable relative to the first cam block 64. The handle or like actuator member 50 is fixedly mounted to the second cam block 66 so that rotational movement of the handle 50 results in like rotational movement of the second cam block 66. It will be understood by those skilled in the art that the present arrangement can alternately include the actuator mounted to the first cam block, and the second cam block can be fixed relative to the table top 18. Such alternate embodiments or arrangements are within the scope of the present invention.

Figure 3A:
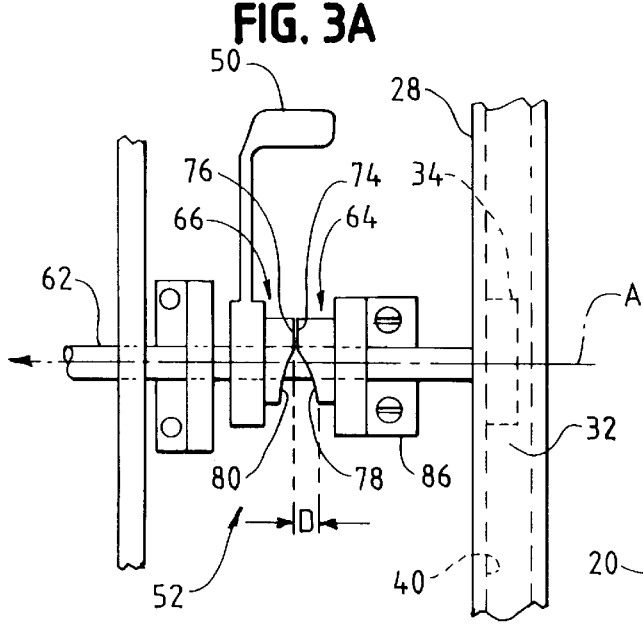
FIG. 3A is an enlarged, partial view of one of the rail engaging clamp devices of the table extension lock, the illustrated engaging clamp including an actuator for engaging and disengaging the locking arrangement, and being shown in the locked state.
Figure 3B:
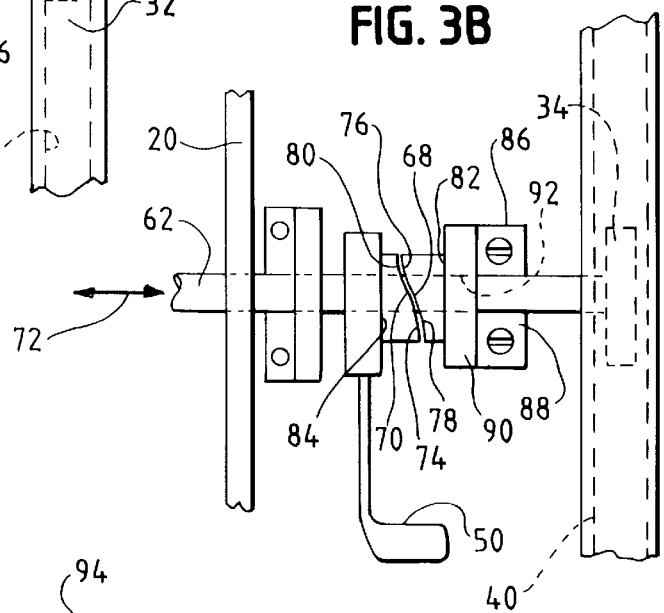
FIG. 3B is a view similar to FIG. 3A, illustrating the locking arrangement in unlocked state.
Figure 4:
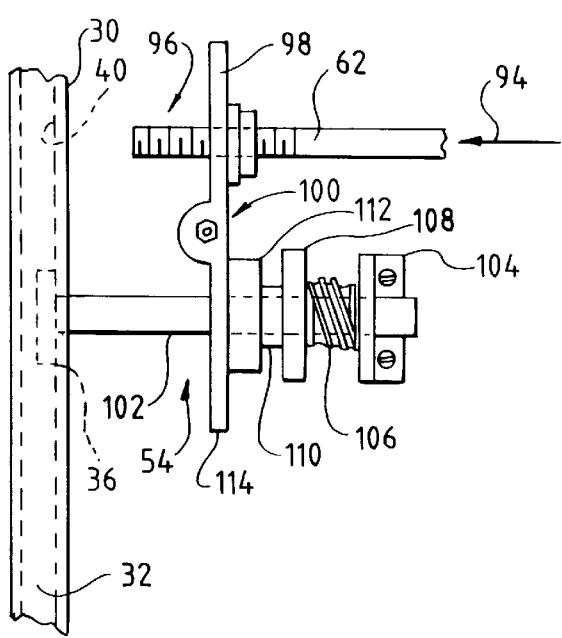
FIG. 4 is an enlarged, partial view of the other rail engaging clamp device illustrated in the locked state.

The cam blocks 64, 66 are moveable relative to one another by cooperative engagement of the camming surfaces 68, 70 between a first extended position (i.e., lobe-to-lobe as illustrated in FIG. 3A) and a second retracted position (i.e., lobe-to-well as illustrated in FIG. 3B), as the block 66 rotates relative to the fixed block 64. In the first extended position as illustrated in FIG. 3A, the lobe portions 74, 76 of the camming surfaces 68, 70 engage one another to engage the locking assembly 16. In this position, the rod 62 at the first clamp 52 is urged inwardly toward the opposing or second clamp 54, as indicated by the arrow at 94. The locking or clamping function is provided by the first rail engaging element 34 that is mounted to the end of the rod 62 engaging an inner surface of the rail 40 to frictionally clamp the engaging element 34 to the rail 28, and thus the rail 28 relative to the table top 18, in the selected position. Referring now to FIG. 4, when in this "locked" position, as indicated by the arrow at 94, an opposing end 96 of the rod 62 engages a first arm 98 of a pivot 100 positioned at about the opposing rail 30.

The pivot 100 is operably connected to the second clamping device 54 for clamping the second rail 30 in a manner similar to the first rail 28. The second clamping device 54 includes a second linkage member 102, such as the illustrated rod that has a second rail engaging element 36 at an end thereof disposed in the channel 32 of the second rail 30. The clamping device 54 is mounted to the table top 18 by a linkage mount 104 that maintains the rod or second linkage member 102 in position at about the rail 30. A biasing member 106, such as the exemplary coil spring, is positioned about the rod 102 with a spacer 108 adjacent thereto. The spacer 108 is maintained at a desired position on the rod 102 by a fastener such as the illustrated threaded nut 110. A second spacer 112 is positioned between the nut 110 and the second pivot arm 114.

As will be apparent from the drawings, movement of the first linkage member 62, as shown by the arrow at 94, urges the first pivot arm 98 toward the rail 30 which in turn pivots or rotates the second pivot arm 114 inwardly, away from the rail 30 against the biasing member 106. This urging motion in turn locks the rail engaging element 36 against the inner surface 40 of the rail 30 to lock the rail 30 and the extension 14 in position relative to the table top 18. Thus, movement of the handle 50 to position the cam blocks 64, 66 in the extended position (i.e., lobe-to-lobe as shown in FIG. 3A) moves both rail engaging elements 34, 36 into engagement with the inner surfaces 40 of their respective rails 28, 30 to lock the rails 28, 30 into the desired position.

Rotating the handle 50 to the opposing (e.g., unlocked) position, as illustrated in FIG. 3B, moves the cam blocks 64, 66 into the "retracted" position which permits the rod 62 to move likewise, which in turn disengages the first rail engaging element 34 from its rail 28. When the rod 62 is moved into this retracted or unlocked position, the biasing element 106 exerts a force on the second pivot arm 114, that in turn permits the second linkage member 102 to move outwardly to disengage the second rail engaging element 36 from its rail 30. With both of the engaging elements 34, 36 disengaged from their respective rails 28, 30, the rails 28, 30 are "unlocked" and the extension portion 14 of the table 10 can be positioned as desired. The position of the extension 14 can then subsequently be locked into any of a continuous, selective variety of positions by rotating the handle 50 into the locked position as shown in FIG. 3A.

From the foregoing, it will be observed that numerous modifications and variations can be effectuated without departing from the true spirit and scope of the novel concepts of the present invention. It is to be understood that no limitation with respect to the specific embodiment illustrated is intended or should be inferred. The disclosure is intended to cover by the appending claims all such modifications as fall within the scope of the claims.

What is claimed is:

1. A locking extension for a tool table having a planar surface and defining a pair of opposing sides comprising:
    first and second rails slidingly mounted to the opposing sides of the tool table;
    an extension having a support surface and being fixedly mounted to and spanning the first and second rails;
    a locking assembly for locking both of the rails to the tool table at a desired position, the locking assembly including a first linkage member having an axis and being pivotable about and longitudinally movable along the axis, the first linkage member being longitudinally movable along the axis by a pair of cooperating cam blocks, the first linkage member having a first rail engaging element mounted to an end engagable with the first rail to lock the first rail into the desired position and disengeable with the first rail to unlock the first rail from the desired position, the locking assembly including a pivot member having a first pivot arm and a second pivot arm, the first pivot arm being operably connected to the first pivot member, the locking assembly further including a second linkage member operably connected to the second pivot arm, the second linkage member being operably connected to and moveable with the first linkage member by the pivot member, the second linkage member having a second rail engaging element mounted to an end engagable with the second rail to lock the second rail into the desired position and disengeable with the second rail to unlock the second rail from the desired position; and
    an actuator operably connected to one of the cam blocks.

2. The locking extension in accordance with claim 1 including a biasing element at about one of the first and second linkage members.

3. The locking extension in accordance with claim 2 wherein the biasing member biases the locking assembly into the unlocked state.

4. The locking extension in accordance with claim 1 wherein one of the cooperating cam blocks is fixed relative to the locking assembly and wherein the actuator is fixedly connected to the other of the cam blocks.

5. The locking extension in accordance with claim 4 wherein the actuator and the cam block fixedly connected thereto are fixedly mounted to the first linkage member.

6. The locking extension in accordance with claim 1 wherein the first and second rail engaging elements engage an inner surface of their respective rails.

7. The locking extension in accordance with claim 1 wherein the actuator is formed as a handle.

8. The locking extension in accordance with claim 1 wherein the cam blocks each include a camming surface defining a lobe portion and a well portion and wherein each cam block includes a base portion in opposing relation to the camming surface, wherein the blocks cooperate with one another by engagement of the camming surfaces to define an extended state wherein the camming surfaces are engaged with one another in a lobe-to-lobe arrangement and a retracted position wherein the camming surfaces are engaged with one another in a lobe-to-well arrangement.

9. A locking extension for a tool table having a planar surface and defining a pair of opposing sides comprising:
    first and second rails slidingly mounted to the opposing sides of the tool table;
    an extension having a support surface and being fixedly mounted to and spanning the first and second rails;
    a locking assembly positionable in a locked state for locking both of the rails to the tool table at a desired position and positionable in an unlocked state for unlocking both of the rails from the desired position, the locking assembly including a first linkage member being longitudinally movable between the locked state and the unlocked state by a pair of cooperating cam blocks, one of the cam blocks being operably connected to the first linkage member, the first linkage member having a first rail engaging element mounted to an end thereof that is engagable with the first rail to lock the first rail into the desired position when in the locked state and disenageable with the first rail to unlock the first rail from the desired position when in the unlocked state, the locking assembly including a pivot member having a first pivot arm and a second pivot arm, the first pivot arm being operably connected to the first pivot member, the locking assembly further including a second linkage member operably connected to the second pivot arm, the second linkage member being operably connected to and moveable with the first linkage member by the pivot member, the second linkage member having a second rail engaging element mounted to an end thereof that is engagable with the second rail to lock the second rail into the desired position when in the locked state and disenageable with the second rail to unlock the second rail from the desired position when in the unlocked state; and an actuator operably connected to one of the cam blocks.

10. The locking extension in accordance with claim 9 including a biasing element at about one of the first and second linkage members.

11. The locking extension in accordance with claim 10 wherein the biasing member biases the locking assembly into the unlocked state.

12. The locking extension in accordance with claim 9 wherein one of the cooperating cam blocks is fixed relative to the locking assembly and wherein the actuator is fixedly connected to the other of the cam blocks.

13. The locking extension in accordance with claim 12 wherein the actuator and the cam block fixedly connected thereto are fixedly mounted to the first linkage member.

14. The locking extension in accordance with claim 9 wherein the first and second rail engaging elements engage an inner surface of their respective rails.

15. The locking extension in accordance with claim 9 wherein the cam blocks each include a lobe portion and a well portion along a contiguous surface and wherein each cam block includes a base portion in opposing relation to the contiguous surface, wherein the blocks cooperate with one another by engagement of the lobe and well surfaces to define an extended state wherein the blocks are engaged with one another in a lobe-to-lobe arrangement and a retracted position wherein the blocks are engaged with one another in a lobe-to-well arrangement.

16. A locking assembly for an extension for a tool table, the tool table defining a pair of opposing sides and having first and second rails slidingly mounted to the opposing sides and an extension having a support surface and being fixedly mounted to and spanning the first and second rails, the locking assembly being positionable in a locked state for locking both of the rails to the tool table at a desired position and positionable in an unlocked state for unlocking both of the rails from the desired position, the locking assembly comprising:

first and second linkage member being movable between the locked state and the unlocked state by a pair of cooperating cam blocks, one of the cam blocks being operably connected to the first linkage member, the first linkage member having a first rail engaging element mounted to an end thereof that is engagable with the first rail to lock the first rail into the desired position when in the locked state and disenageable with the first rail to unlock the first rail from the desired position when in the unlocked state;

a pivot member having a first pivot arm and a second pivot arm, the first pivot arm being operably connected to the first pivot member, the locking assembly further including a second linkage member operably connected to the second pivot arm, the second linkage member being operably connected to and moveable with the first linkage member by the pivot member, the second linkage member having a second rail engaging element mounted to an end thereof that is engagable with the second rail to lock the second rail into the desired position when in the locked state and disenageable with the second rail to unlock the second rail from the desired position when in the unlocked state; and an actuator operably connected to one of the cam blocks.

17. The locking assembly in accordance with claim 16 including a biasing element at about one of the first and second linkage members.

18. The locking extension in accordance with claim 17 wherein the biasing member biases the locking assembly into the unlocked state.

19. The locking extension in accordance with claim 16 wherein one of the cooperating cam blocks is fixed relative to the locking assembly and wherein the actuator is fixedly connected to the other of the cam blocks.

20. The locking extension in accordance with claim 19 wherein the actuator and the cam block fixedly connected thereto are fixedly mounted to the first linkage member.

21. The locking extension in accordance with claim 16 wherein the cam blocks each include a camming surface defining a lobe portion and a well portion and wherein each cam block includes a base portion in opposing relation to the camming surface, wherein the blocks cooperate with one another by engagement of the camming surfaces to define an extended state wherein the camming surfaces are engaged with one another in a lobe-to-lobe arrangement and a retracted position wherein the camming surfaces are engaged with one another in a lobe-to-well arrangement.

* * * * *